(12) United States Patent
Cheng et al.

(10) Patent No.: US 11,729,790 B2
(45) Date of Patent: Aug. 15, 2023

(54) MOBILE COMMUNICATIONS METHODS FOR MONITORING AND SCHEDULING

(71) Applicant: Samsung Electronics Co., Ltd., Suwon-si (KR)

(72) Inventors: Yuan-Sheng Cheng, San Diego, CA (US); Jung Hyun Bae, San Diego, CA (US); Hamid Saber, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 17/373,687

(22) Filed: Jul. 12, 2021

(65) Prior Publication Data

US 2022/0046610 A1 Feb. 10, 2022

Related U.S. Application Data

(60) Provisional application No. 63/165,398, filed on Mar. 24, 2021, provisional application No. 63/138,585, filed on Jan. 18, 2021, provisional application No. 63/063,008, filed on Aug. 7, 2020, provisional application No. 63/062,275, filed on Aug. 6, 2020, provisional application No. 63/062,051, filed on Aug. 6, 2020, provisional application No. 63/062,234, filed on Aug. 6, 2020.

(51) Int. Cl.
*H04W 72/23* (2023.01)
*H04W 72/04* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC ................. H04W 72/042; H04W 72/0446
See application file for complete search history.

(56) References Cited

U.S. PATENT DOCUMENTS

| | | |
|---|---|---|
| 7,840,646 B2 | 11/2010 | Davis et al. |
| 8,676,934 B2 | 3/2014 | Takakura |
| 2009/0326759 A1 | 12/2009 | Hensel et al. |
| 2014/0143387 A1 | 5/2014 | Takakura |
| 2015/0281651 A1 | 10/2015 | Kaushik et al. |
| 2016/0033659 A1 | 2/2016 | Coutrakon et al. |
| 2019/0306186 A1 | 10/2019 | Zheng et al. |
| 2021/0091251 A1 | 3/2021 | Onal et al. |

(Continued)

FOREIGN PATENT DOCUMENTS

WO  WO 2020/032681 A1  2/2020

OTHER PUBLICATIONS

EPO Office Action dated Apr. 7, 2022, for corresponding European Patent Application No. 21 187 444.1 (10 pages).

(Continued)

*Primary Examiner* — Ronald B Abelson
(74) *Attorney, Agent, or Firm* — Lewis Roca Rothgerber Christie LLP

(57) ABSTRACT

A system and method for monitoring and scheduling. In some embodiments, the method includes receiving, by a user equipment (UE), a downlink control information (DCI), the DCI specifying the scheduling of a first Physical Downlink Shared Channel (PDSCH) and a second PDSCH.

19 Claims, 19 Drawing Sheets

| $\mu$ | Maximum number $M_{PDCCH}^{maxslot,\mu}$ of monitored PDCCH candidates per slot and per serving cell |
|---|---|
| 0 | 44 |
| 1 | 36 |
| 2 | 22 |
| 3 | 20 |

(56) References Cited

U.S. PATENT DOCUMENTS

2022/0312446 A1\* 9/2022 Choi ................. H04W 72/1268
2022/0369225 A1\* 11/2022 Iyer ....................... H04L 5/0053

OTHER PUBLICATIONS

Samsung: "Discussion on intra-UE multiplexing," 3rd Generation Partnership Project (3GPP), R1-1901073, Jan. 2019, XP051593918, 4 pages, Retrieved from the Internet: URL:http://www.3gpp.org/ftp/Meetings%5F3GPP%5FSYNC/RAN1/Docs/R1%2D1901073%2Ezip.

Qualcomm Incorporated: "Multi-TRP Enhancements," 3rd Generation Partnership Project (3GPP), R1-1912967, Nov. 2019, XP051823729, 21 pages, Retrieved from the Internet: URL:https://ftp.3gpp.org/tsg_ran/WG1_RL1/TSGR1_99/Docs/R1-1912967.zip.

Moderator (OPPO): "FL summary #2 for Multi-TRP/Panel Transmission," 3rd Generation Partnership Project (3GPP), R1-2004719, May 2020, XP051890584, 35 pages, Retrieved from the Internet: URL:https://ftp.3gpp.org/tsg_ran/WG1_RL1/TSGR1_101-e/Docs/R1-2004719.zip.

EPO Extended European Search Report dated Jan. 5, 2022, issued in corresponding European Patent Application No. 21187444.1 (13 pages).

\* cited by examiner

| $\mu$ | Maximum number $M_{PDCCH}^{maxslot,\mu}$ of monitored PDCCH candidates per slot and per serving cell |
|---|---|
| 0 | 44 |
| 1 | 36 |
| 2 | 22 |
| 3 | 20 |

FIG. 1A

| $\mu$ | Maximum number $C_{PDCCH}^{maxslot,\mu}$ of non-overlapped CCEs per slot and per serving cell |
|---|---|
| 0 | 56 |
| 1 | 56 |
| 2 | 48 |
| 3 | 32 |

FIG. 1B

| $\mu$ | Maximum number $M_{PDCCH}^{max,(X,Y),\mu}$ of monitored PDCCH candidates per span for combination $(X,Y)$ and per serving cell | | |
|---|---|---|---|
| | (2, 2) | (4, 3) | (7, 3) |
| 0 | 14 | 28 | 44 |
| 1 | 12 | 24 | 36 |

FIG. 2B

| $\mu$ | Maximum number $C_{PDCCH}^{max,(X,Y),\mu}$ of non-overlapped CCEs per span for combination $(X,Y)$ and per serving cell | | |
|---|---|---|---|
| | (2, 2) | (4, 3) | (7, 3) |
| 0 | 18 | 36 | 56 |
| 1 | 18 | 36 | 56 |

FIG. 2C

Table 5.3-1: PDSCH processing time for PDSCH processing capability 1

| $\mu$ | PDSCH decoding time $N_1$ [symbols] | |
| --- | --- | --- |
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

FIG. 4A

Table 5.3-2: PDSCH processing time for PDSCH processing capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

FIG. 4B

Table 6.4-1: PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

FIG. 4C

Table 6.4-2: PUSCH preparation time for PUSCH timing capability 2

| $\mu$ | PUSCH preparation time $N_2$ [symbols] |
|---|---|
| 0 | 5 |
| 1 | 5.5 |
| 2 | 11 for frequency range 1 |

FIG. 4D

Table 5.5-1: $N_{pdsch}$ as a function of the subcarrier spacing of the scheduling PDCCH

| $\mu_{PDCCH}$ | $N_{pdsch}$ [symbols] |
|---|---|
| 0 | 4 |
| 1 | 5 |
| 2 | 10 |
| 3 | 14 |

FIG. 4E

| Value of the Redundancy version field | Value of $rv_{id}$ to be applied |
|---|---|
| 0 | 0 |
| 1 | 2 |

FIG. 5A

MOBILE COMMUNICATIONS METHODS FOR MONITORING AND SCHEDULING

CROSS-REFERENCE TO RELATED APPLICATION(S)

The present application claims priority to and the benefit of (i) U.S. Provisional Application No. 63/062,051, filed Aug. 6, 2020, entitled "METHODS OF FLEXIBLE PDCCH MONITORING CAPABILITY FOR HIGHER SCS", (ii) U.S. Provisional Application No. 63/138,585, filed Jan. 18, 2021, entitled "METHODS OF FLEXIBLE PDCCH MONITORING CAPABILITY FOR HIGHER SCS", (iii) U.S. Provisional Application No. 63/165,398, filed Mar. 24, 2021, entitled "METHODS OF FLEXIBLE PDCCH MONITORING CAPABILITY FOR HIGHER SCS", (iv) U.S. Provisional Application No. 63/062,234, filed Aug. 6, 2020, entitled "Methods of dynamic scheduling multiple PDSCH by a single DCI", (v) U.S. Provisional Application No. 63/062,275, filed Aug. 6, 2020, entitled "METHODS OF DYNAMIC SCHEDULING MULTIPLE PDSCH BY A SINGLE DCI", and (vi) U.S. Provisional Application No. 63/063,008, filed Aug. 7, 2020, entitled "METHODS OF DYNAMIC SCHEDULING MULTIPLE PDSCH BY A SINGLE DCI"; the entire contents of all of the documents identified in this paragraph are incorporated herein by reference.

FIELD

One or more aspects of embodiments according to the present disclosure relate to mobile communications, and more particularly to systems and methods for accommodating a high subcarrier spacing in OFDM based mobile communications.

BACKGROUND

In mobile communications (e.g., 5G) systems, the use of high subcarrier spacings (e.g., 480 kHz or more) may result in various challenges. For example, limits on the Physical Downlink Control Channel (PDCCH) monitoring per slot, and on the number of non-overlapped control channel elements (CCEs) per slot, may be challenging to meet, and achieving high throughput may also be challenging if each Downlink Control Information (DCI) schedules only one Physical Downlink Shared Channel (PDSCH).

Thus, there is a need for systems and methods for accommodating a high subcarrier spacing in mobile communications.

SUMMARY

According to an embodiment of the present disclosure, there is provided a method, including: receiving, by a user equipment (UE), a downlink control information (DCI), wherein the DCI specifies the scheduling of a first Physical Downlink Shared Channel (PDSCH) and a second PDSCH.

In some embodiments: the DCI identifies a first row of a time domain resource allocation TDRA table; the first row of the TDRA table specifies the scheduling of a first number of PDSCHs; and a second row of the TDRA table specifies the scheduling of a second number of PDSCHs, different from the first number.

In some embodiments, the DCI does not contain a code block group (CBG) field.

In some embodiments, the method further includes: receiving, by the UE, an indication that a third PDSCH will not be transmitted; receiving the first PDSCH; receiving the second PDSCH; and not receiving the third PDSCH.

In some embodiments, the DCI includes a timing offset, and the method further includes transmitting an ACK or a NACK in a Physical Uplink Control Channel (PUCCH) slot, the PUCCH slot following a latest scheduled PDSCH by the timing offset.

In some embodiments, the DCI includes a downlink assignment index (DAI), the DAI having a value greater, by more than one, than a DAI in a most recent previously received DCI, wherein the difference between the DAI and the DAI in the most recent previously received DCI equals the number of start and length indicators (SLIVs) in a row of a time domain resource allocation (TDRA) table identified by the DCI.

In some embodiments, the method further includes transmitting, by the UE, in a PUCCH, a number of bits, the number being the maximum, over each of the active serving cells configured to the UE, of the product of: the maximum number of code block groups (CBGs) per PDSCH over the serving cell, and the maximum number of start and length indicators (SLIVs) in any row of the time domain resource allocation (TDRA) table for the serving cell, wherein the DCI includes a downlink assignment index (DAI), the DAI having a value greater, by one, than a DAI in the previous DCI.

In some embodiments, the DCI includes a first downlink assignment index (DAI) corresponding to the first PDSCH and a second DAI corresponding to the second PDSCH.

In some embodiments, the method further includes: reporting, by the UE, a capability to perform processing of non-overlapping control channel elements (CCEs) within a first limit and processing of Physical Downlink Control Channels (PDCCHs) within a second limit over a number of consecutive slots, the first limit being P non-overlapping CCEs, the second limit being Q PDCCHs, and the number of consecutive slots being N, P, Q, and N being positive integers; processing, by the UE, P CCEs received within M slots, M being less than or equal to N; and processing, by the UE, Q PDCCHs received within the M slots, P being greater than a corresponding standard-specified per-slot limit, P being less than or equal to the product of N and the corresponding standard-specified per-slot limit, Q being greater than a corresponding standard-specified per-slot limit, and Q being less than or equal to the product of N and the corresponding standard-specified per-slot limit.

In some embodiments, the method further includes: reporting, by the UE, as a capability, the value of P and reporting, by the UE, as a capability, the value of Q.

In some embodiments, the method further includes reporting, by the UE, as a capability, the value of N.

In some embodiments, the method further includes receiving the P CCEs in resource elements having a subcarrier spacing of 480 kHz or more.

In some embodiments, the processing, by the UE, of the P CCEs includes processing no CCEs received within $N-N_0$ slots, $N_0$ being a positive integer.

In some embodiments, the method further includes sending, by the UE, an ACK, the ACK following a last symbol of a corresponding Physical Downlink Shared Channel (PDSCH) by a processing time greater than a corresponding standard-specified processing time for non-aggregated BD/CCE limits.

In some embodiments, the method further includes sending, by the UE, a PUSCH, the PUSCH following a last symbol of a corresponding PDCCH by a preparation time greater than a corresponding standard-specified preparation time for non-aggregated BD/CCE limits.

In some embodiments, a PDCCH of the Q PDCCHs schedules a PDSCH, the method further including receiving, by the UE, the PDSCH, the PDSCH beginning d symbols after the PDCCH, d being a positive integer, d being a standard-specified value or a value reported as a capability by the UE.

According to an embodiment of the present disclosure, there is provided a system including: a user equipment (UE), the UE including: a radio; and a processing circuit, the processing circuit being configured to receive a downlink control information (DCI), wherein the DCI specifies the scheduling of a first Physical Downlink Shared Channel (PDSCH) and a second PDSCH.

In some embodiments: the DCI identifies a first row of a time domain resource allocation (TDRA) table; the first row of the TDRA table specifies the scheduling of a first number of PDSCHs; and a second row of the TDRA table specifies the scheduling of a second number of PDSCHs, different from the first number.

In some embodiments, the DCI does not contain a code block group (CBG) field.

According to an embodiment of the present disclosure, there is provided a system including: a user equipment (UE), the UE including: a radio; and means for processing, the means for processing being configured to receive a downlink control information (DCI), wherein the DCI specifies the scheduling of a first Physical Downlink Shared Channel (PDSCH) and a second PDSCH.

BRIEF DESCRIPTION OF THE DRAWINGS

These and other features and advantages of the present disclosure will be appreciated and understood with reference to the specification, claims, and appended drawings wherein:

FIG. 1A is a table of maximum monitored PDCCH candidates per slot;

FIG. 1B is a table of a maximum number of non-overlapped Control Channel Elements (CCE) per slot;

FIG. 2B is a table of the maximum number of monitored PDCCH candidates in a span;

FIG. 2C is a table of the maximum number of non-overlapped CCEs in a span;

FIG. 4A is a table of processing time requirements;
FIG. 4B is a table of processing time requirements;
FIG. 4C is a table of preparation time requirements;
FIG. 4D is a table of preparation time requirements;
FIG. 4E is a table of $N_{pdsch}$;
FIG. 5A is a table of $rv_{id}$, according to some embodiments of the present disclosure;

DETAILED DESCRIPTION

Figure 2A:
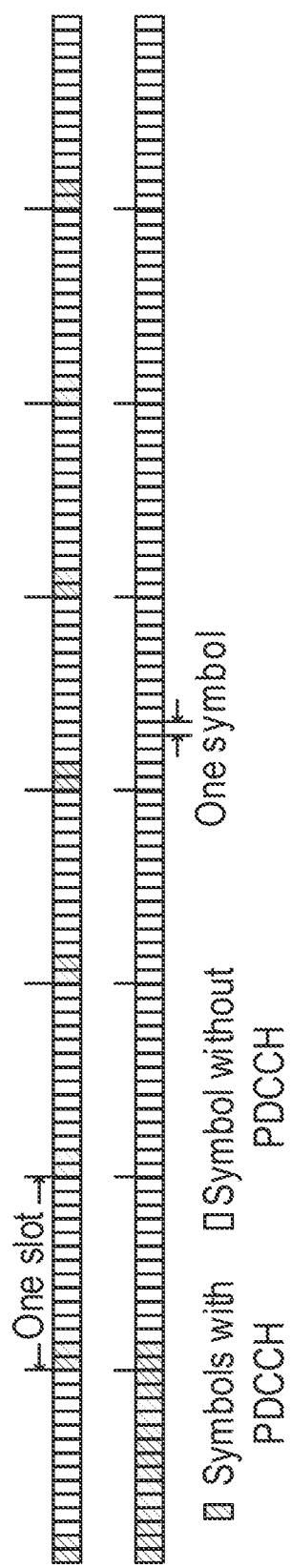
FIG. 2A shows examples of PDCCH monitoring locations over 8 slots, according to some embodiments of the present disclosure.

The detailed description set forth below in connection with the appended drawings is intended as a description of exemplary embodiments of systems and methods for accommodating a high subcarrier spacing in mobile communications provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the Release 17 (Rel-17) New Radio (NR) 52 GHz to 71 GHz study item, in order to achieve higher bandwidth with the same fast Fourier transform (FFT) size of 4096 and to combat phase noise in the higher frequency bands, there is a desire to adapt new subcarrier spacings (SCSs) in this new frequency band. There are two fundamental issues that may arise with adoption of higher SCSs. First, there is a 3 dB coverage reduction when the SCS is doubled under the same channel conditions. This is due to the achievable Tx power not increasing when increasing the subcarrier spacing, so the power spectral density decreases with increasing subcarrier spacing for the same number of subcarriers. Second, the Physical Downlink Control Channel (PDCCH) monitoring capability decreases with increasing SCS. Current NR monitoring capability is defined as maximum monitoring PDCCH candidates per slot and maximum number of non-overlapped Control Channel Elements (CCE) per slot, as shown in Table 10.1-2 (FIG. 1A) and Table 10.1-3 (FIG. 1B) [Clause 10.1, TS 38.213]. It may be seen from the tables that both numbers decrease when the SCS increases. Based on the trend, a further decrease is expected for higher SCS. In particular, the maximum non-overlapped CCEs is expected to be less than 16 when the SCS is equal to 960 kHz, which is not sufficient for an AL16 candidate in this environment.

In some embodiments, therefore, maximum BD/CCE limits are defined on a duration with more than one slot. This allows the network node (gNB) to have the flexibility to configure PDCCH monitoring occasions in a period with more than one slot. This may have the following advantages:

(i) By concentrating these allocable non-overlapping CCEs in single slot, the gNB may allow multiple AL16 PDCCH candidates in one slot, which may improve the coverage for PDCCH.

(ii) The UE is not required to monitor PDCCH every slot. This may result in UE power savings when the traffic is low.

As used herein, the phrase "user equipment" is used as a countable noun even though the noun it contains ("equipment") may not be countable in ordinary English. Similarly, the phrase Downlink Control Information (DCI) is also used as a countable noun.

FIG. 2A shows examples of PDCCH monitoring locations over 8 slots. As mentioned above, one approach to solve the exponential decrease of maximum non-overlapped CCEs over one slot is to determine the limit based on a period of multiple slots. However, depending on the UE receiver processing flow for non-overlapped CCEs, the CCE limit is not necessarily aggregated in a convenient manner. For example, FIG. 2A shows two different allocations of PDCCH monitoring occasions over eight slots. Assuming each symbol has the same non-overlapped CCEs and BD allocation, the two examples shown in FIG. 2A have exactly same BD/non-overlapped CCEs number over eight slots. However, they are not quite the same from the UE's point of view. That the UE can process Y non-overlapping CCEs in each of the eight contiguous slots does not mean that the UE can process 8×Y non-overlapping CCEs in a single slot. As such, in some embodiments, there may be an upper limits for CCEs in one slot even if the UE is only required to process CCEs for one in N slots.

On the other hand, if the UE can handle non-overlapping CCEs aggregation over eight slots, it should be able to handle any non-overlapping CCEs aggregation over fewer than eight slots. This can be handled by UE capability reporting. The following disclosure describes a plurality of embodiments, some of which are numbered, so that they may be referred to by number, and some of which include numbered alternatives or options.

Embodiment 1: The UE capability for aggregating the maximum BD/CCEs over multiple slots is a UE capability (e.g., either an optional capability or mandated for some frequency bands, e.g., above 52.6 GHz). Additional capability values may be signaled (i.e., signed to the gNB by the UE) as follows:

Alternative 1: For a numerology $\mu$ and maximum non-overlapped CCEs Y, the UE may report capability $N_\mu$ such that:

(i) The UE is able to process maximum $N_\mu \times Y$ non-overlapping CCEs within a slot under the condition that the UE only needs to process a maximum of $N_\mu \times Y$ non-overlapping CCEs within any given $N_\mu$ consecutive slots.

(ii) The network may configure maximum non-overlapped aggregated CCEs based on M slots when $M \leq N_\mu$.

Alternative 2: For a numerology $\mu$ and maximum non-overlapped CCEs Y per slot, the UE may report capability X, where $Y \leq X$. The network is then permitted to allocate up to X non-overlapped CCEs in some slots, under the conditions that the total number of configured non-overlapping CCEs is equal or less than $N_\mu \cdot Y$ over any period of $N_\mu$ slots. $N_\mu$ is a constant (i.e., a standard-specified constant) to be determined. As used herein, "standard-specified" means specified by the 3rd Generation Partnership Project (3GPP), e.g., in the 38-series 5G specifications or in specifications that may supersede or supplement these specifications in the future.

Alternatively, the maximum BD/CCE may be directly defined over N (some number to be specified) slots for higher SCS. For example, if the maximum non-overlapping CCEs over N slots is Y, it means that the UE can process Y non-overlapping CCEs within N slots, regardless where these CCEs are configured during the N slots.

Embodiment 2: In this embodiment, for higher SCS such as 480 kHz, 960 kHz, or 1920 kHz, the definition for maximum BD/CCEs is based on multiple slots. Alternatively, when defining maximum BD/CCEs based on multiple slots (e.g., N slots), the BD/CCEs can be confined within $N_0$ consecutive slots in each set of N slots.

Embodiment 2a: In this embodiment, the definition for maximum BD/CCEs based on multiple slots in Embodiment 2 is confined within $N_0$ consecutive slots in N slots (i.e., BD/CCEs may be absent from $N-N_0$ slots), where:

Alternative 1: The value of $N_0$ is determined by UE capability, or

Alternative 2: The value of $N_0$ is a pre-determined (e.g., a standard-specified) number.

The location of $N_0$ consecutive slots may be arbitrary within a duration of N slots, or additional restrictions on this location can be applied. For example, it may be required that the locations of these $N_0$ consecutive slots inside repeating sets of N slots form a fixed pattern.

Embodiment 2b: In this embodiment, the PDCCH capability for maximum BD/CCEs based on multiple slots is defined in such a way that all of the BD/CCEs are confined within $N_0$ consecutive slots in N slots. The location of these $N_0$ consecutive slots can be:

Alternative 1: No restriction within N slots, or

Alternative 2: Arbitrary within N slots, but the pattern for every N slots is fixed, e.g., the pattern repeats within each set of N slots.

In Rel-16 URLLC, a new type of per span (instead of per slot) PDCCH monitoring capability is defined. For every serving cell, if the UE has the capability, the gNB can configure the monitoring capability either per slot or per span.

A UE can indicate a capability to monitor PDCCH according to one or more of the combinations (X,Y)=(2, 2), (4, 3), and (7, 3) per SCS configuration of $\mu=0$ and $\mu=1$. A span is a number of consecutive symbols in a slot within which the UE is configured to monitor PDCCH. Each PDCCH monitoring occasion is within one span. If a UE monitors PDCCH on a cell according to combination (X,Y), the UE supports PDCCH monitoring occasions in any symbol of a slot with minimum time separation of X symbols between the first symbol of two consecutive spans, including across slots. A span starts at a first symbol where a PDCCH monitoring occasion starts, and ends at a last symbol where a PDCCH monitoring occasion ends, where the number of symbols of the span is up to Y.

If a UE indicates a capability to monitor PDCCH according to multiple (X,Y) combinations and a configuration of search space sets to the UE for PDCCH monitoring on a cell results in a separation of every two consecutive PDCCH monitoring spans that is equal to or larger than the value of X for one or more of the multiple combinations (X, Y), the UE monitors PDCCH on the cell according to the combination (X,Y), from the one or more combinations (X, Y), that is associated with the largest maximum number of $M_{PDCCH}^{max,(X,Y),\mu}$ and $C_{PDCCH}^{max,(X,Y),\mu}$ defined in Table 10.1-2A (FIG. 2B) and Table 10.1-3A (FIG. 2C). The UE expects to monitor PDCCH according to the same combination (X,Y) in every slot on the active downlink (DL) bandwidth part (BWP) of a cell.

By changing the span unit definition to slot (instead of symbol), a similar concept may be employed to define the UE PDCCH Monitoring capability in higher SCS. For multiple slot span $(X,Y)_{slot,\mu}$, associated $M_{PDCCH}^{max,(X,Y)_{slot},\mu}$ may be defined for different SCSs. If the UE has reported supporting certain $(X,Y)_{slot,\mu}$ the network can configure monitoring occasions according to maximum $C_{PDCCH}^{max,(X,Y)_{slot},\mu}$ CCEs for every X slots, and the allocated CCEs in every X slots are concentrated in Y consecutive slots or Y consecutive symbols in the corresponding SCS.

Embodiment 3: In this embodiment, maximum BD/CCEs are defined based on multiple slot spans $(X,Y)_{slot,\mu}$, where X is defined in terms of slots and Y can be defined either in terms of slots or symbols in the corresponding numerology $\mu$. This embodiment can have multiple options:

Alternative 1: The values $M_{PDCCH}^{max,(X,Y)_{slot,\mu}}$, $C_{PDCCH}^{max,(X,Y)_{slot,\mu}}$ may be defined for multiple pre-determined $(X,Y)_{slot,\mu}$ multiple slot spans and the UE indicates one or multiple $(X,Y)_{slot,\mu}$ to support for each SCS.

Alternative 2: The UE reports multiple capabilities of $M_{PDCCH}^{max,(X,Y)_{slot,\mu}}$, $C_{PDCCH}^{max,(X,Y)_{slot,\mu}}$ for each pre-determined $(X,Y)_{slot,\mu}$ span.

Alternative 3: The UE reports multiple capabilities of $M_{PDCCH}^{max,(X,Y)_{slot,\mu}}$, $C_{PDCCH}^{max,(X,Y)_{slot,\mu}}$ for multiple UE defined $(X,Y)_{slot,\mu}$ spans.

Various ways of defining UE PDCCH capabilities as addressed in Embodiment 1, Embodiment 2 and Embodiment 3 may be considered to be different ways to define a similar concept. They all involve one way or another to aggregate Rel-15 UE monitoring capabilities per slot in short periods and to allow the UE to rest some period after that. The following section, which discusses search space and PDCCH monitoring signalling based on multiple slots, examines the impacts of this behavior in a different prospective.

In NR, a SS (search space) set may be configured for the UE to monitor PDCCH. Up to 10 SS sets can be configured for each DL BWP in a serving cell. The time domain pattern of a SS set is configured by the following RRC parameters:

(i) a PDCCH monitoring periodicity of $k_s$ slots and a PDCCH monitoring offset of $o_s$ slots, by monitoringSlotPeriodicityAndOffset, (ii) a PDCCH monitoring pattern within a slot, indicating first symbols of the CORESET within a slot for PDCCH monitoring, by monitoringSymbolsWithinSlot, and (iii) a duration of $T_s<k_s$ slots indicating a number of slots that the search space set s exists by duration.

Once the methods to define the capability over multiple slots are chosen, the details of how to determine a search space configuration satisfying the given capability may be addressed. These details may affect UE behavior such as the overbook rule.

For example, in Rel-15 span based PDCCH monitoring capability, there is a procedure (from TS38.822) to determine the actual span $(X,Y)_\mu$ for a given search space, for which a bitmap of length 14 is introduced wherein each bit corresponds to one symbol in a slot. The bit takes the value 1 if any SS configuration covers that symbol. The final requirement of (X, Y) is defined based on the bitmap. The above procedure assumes a restriction on the span pattern to be repeated within a slot.

Figure 3A:
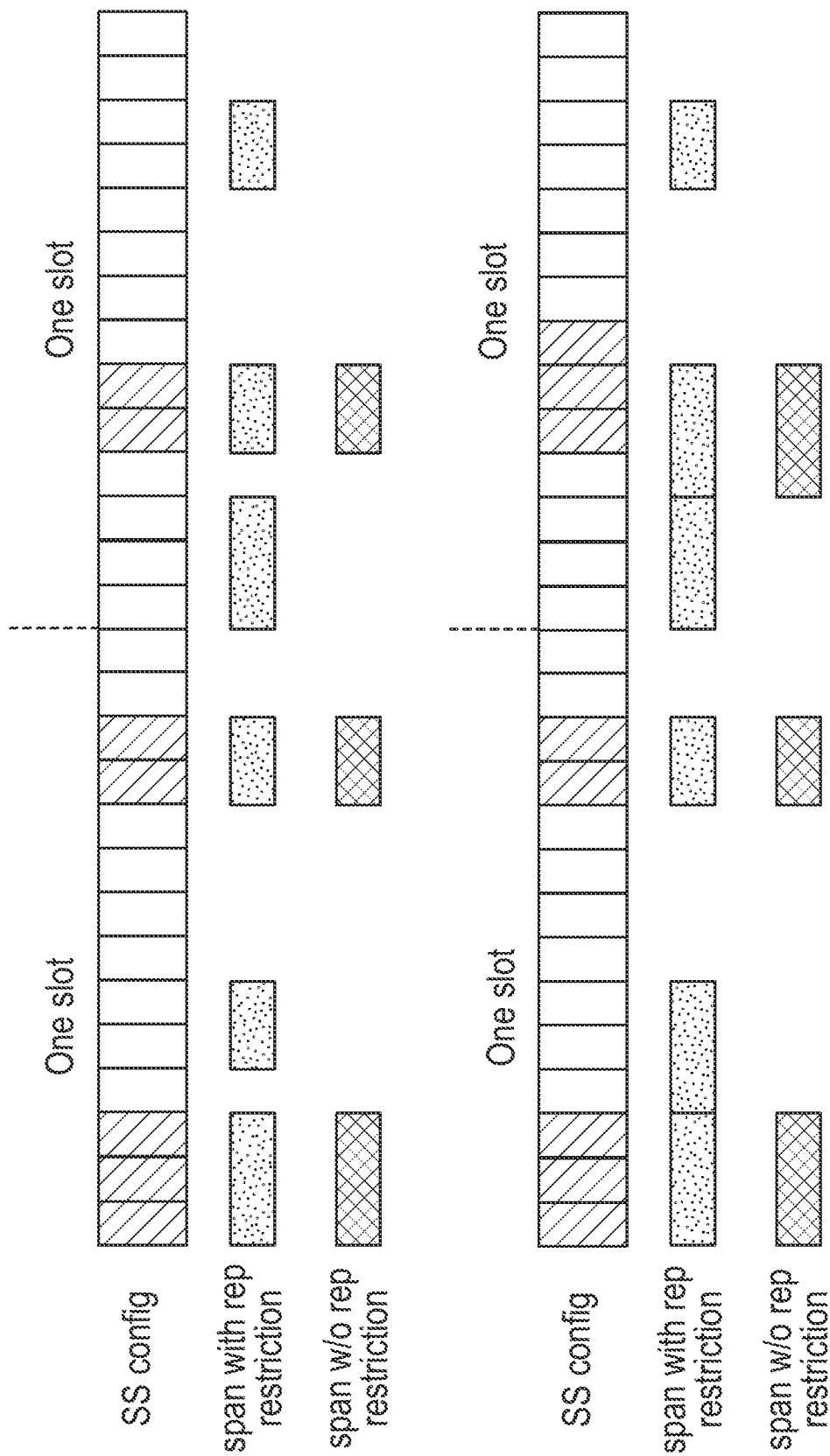
FIG. 3A is an illustration for a concept of repetition restriction in Rel-15 span based monitoring, according to some embodiments of the present disclosure.

Examples are shown in FIG. 3A: in the first example (the upper portion of FIG. 3A), the bitmap is 11101100001100, and satisfies (X=4, Y=3); while in the second example (the lower portion of FIG. 3A), the bitmap is 11111100001100, and does not satisfy (X=4, Y=3). Both examples satisfy (X=4, Y=3) if there is no repetition restriction. Such a span repetition restriction introduces further restrictions on the SS configuration.

Such a repetition restriction may facilitate UE implementation, e.g., by providing uniform operation in every slot. Further, it may provide a way to quickly determine such (X,Y) for a set of search spaces. In the absence of restriction requirements, the UE or gNB may need to determine such (X,Y) slot by slot, which may be not efficient.

Multiple slot based PDCCH monitoring capability may relax UE implementation complexity due to the short duration of the slots. It may be beneficial for the UE to have same active and some inactive operation over a period of multiple slots. In some embodiments, a multiple slot based PDCCH monitoring capability is only used for higher SCSs. The repetition restriction over multiple slots for higher SCSs may be similar to slot based repetition restrictions in lower SCSs.

In Embodiment 4: In this embodiment, the PDCCH monitoring capability is based on a multiple slot span $(X,Y)_{slot,\mu}$, and supports a repetition restriction over multiple slots. The following alternatives are possible:

Alternative 1: The repetition "period" N can be a pre-defined fixed slot number. For example, N=4 for 480 kHz SCS and N=8 for 960 kHz SCS.

Alternative 2: The repetition "period" N can be based on UE capability. For example, the UE can report supporting a value from a pre-defined set of values N(s) and the gNB can configure based on the reported value.

For multi-slot PDCCH monitoring based on N slots (Embodiment 1 and 2), there are two options as to where this "N slot" window is located in the time domain. As used herein, the term "N slot" (or "N slot" window), including the quotation marks, refers to a contiguous set of N slots.

Option 1: the "N slot" window can be aligned with some known time boundary; for example, it can be aligned with the frame boundary corresponding to system frame number SFN=0.

Option 2: the "N slot" can be interpreted as a sliding window. For example, if a capability is defined for an "N slot" window, then within every sliding "N slot" window, the PDCCH monitoring configurations may satisfy the capability constraint.

From TS38.213, for a search space sets with monitoring periodicity of $k_s$ slots and a PDCCH monitoring offset of $o_s$ slots, the UE determines that a PDCCH monitoring occasion exists in a slot with number $n_{s,f}^\mu$ in a frame with number $n_f$, if $(n_f \cdot N_{slot}^{frame,\mu}+n_{s,f}^\mu-o_s) \bmod k_s=0 (n_f N_{slot}^{frame,\mu}+n_{s,f}^\mu-o_{p,s})$ mod $k_{p,s}$. As such, the search space is defined in a way that is aligned with a frame boundary with SFN=0. In some embodiments, the "N slot" window used to define the PDCCH monitoring capability is also aligned with this point, so that both the UE and the gNB can determine the capability easily for a given search space set.

Embodiment 5: In this embodiment, when PDCCH Monitoring capabilities (all alternatives in Embodiment 1 and 2) are defined based on "N slots", the locations of these "N slots" can be:

Alternative 1: Align one of the "N slots" windows with frame boundary in a frame with SFN=0.

Alternative 2: Align one of the "N slots" windows to a time instant $t_0$, where $t_0$ is o* after the frame boundary of the frame with SFN=0, and o* is the smallest offset $o_s$ among the search spaces in the search space set.

Figure 3B:
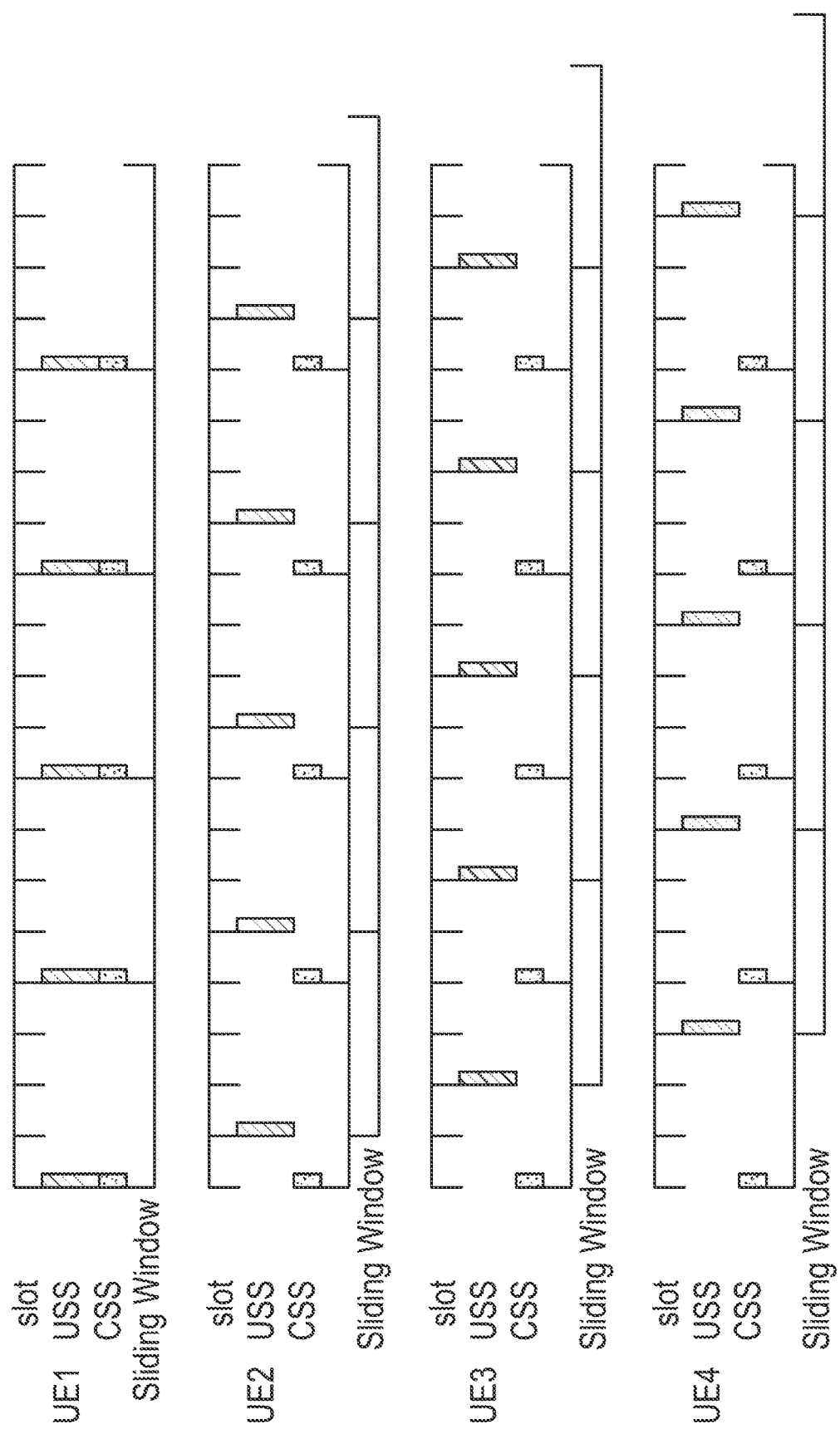
FIG. 3B is an illustration of staggered user equipment specific search space (USS) scheduling, according to some embodiments of the present disclosure.

Some embodiments relate to methods for handling CSS and USS between multiple UEs. The RAN1 104e, contains a concern regarding approaches such as Embodiment 2a and Embodiment 3, which is that both of them create forbidden gaps within which a gNB may not allocate PDCCH resources. The gNB may not be able to configure multiple UE's to share the same common search space (CSS) with staggered UE specific search space (USS) (see FIG. 3B), where common usage cases appear.

As such, Embodiment 2a may be modified to use separate UE capabilities for CSS and USS, and to combine this with the approach of Alternative 2 of Embodiment 5 with respect to the locations of the "N slot" windows. This gives the gNB the flexibility to configure the staggered USSs with common CSSs in a multiple UE scheduling scenario like that of FIG. 3B.

Embodiment 6: In this embodiment, PDCCH Monitoring capabilities are defined using Embodiment 2a, the gNB and the UE may support the option to indicate separate PDCCH monitoring capabilities for CSS and USS.

If PDCCH monitoring capabilities are defined based on a multiple slot span $(X,Y)_{slot,\mu}$ (Embodiment 3), a similar approach may be used by checking the $(X,Y)_{slot,\mu}$ conditions separately for CSS and USS. This can be done with or without separate UE capabilities for USS and CSS.

Embodiment 7: In this embodiment, PDCCH Monitoring capabilities are defined based on multiple slot spans $(X,Y)_{slot,\mu}$ (Embodiment 3), and the option to apply $(X,Y)_{slot,\mu}$ conditions separately for CSS and USS may be supported. This can be done by:

Alternative 1: Applying the same PDCCH monitoring capabilities based on multi-slot span $(X,Y)_{slot,\mu}$ but checking the span and gap conditions separately for CSS and USS.

Alternative 2: Applying separate PDCCH monitoring capabilities based on multi-slot span $(X,Y)_{slot,\mu}$ for CSS and USS.

In some embodiments, the UE PDSCH processing and PUSCH preparation time requirements may be adjusted under a flexible PDCCH monitoring capability (e.g., the processing time requirements may be relaxed, when the UE is operating under aggregated BD/CCE and PDCCH limits, relative to the PDSCH processing and PUSCH preparation time requirements the UE would be required to meet if it were operating under non-aggregated BD/CCE and PDCCH limits). Aggregation of PDCCH monitoring can be configured by the network. Such aggregated PDCCH monitoring will have an impact on Physical Downlink Shared Channel (PDSCH) processing time $T_{proc,1}$ and Physical Uplink Shared Channel (PUSCH) preparation time $T_{proc,2}$ because PDSCH processing and PUSCH preparation are affected by PDCCH decoding delay when they are dynamically scheduled by PDCCH, and because with aggregated PDCCH monitoring, the PDCCH decoding delay may be increased.

PDSCH processing time is defined as the amount of time after the end of the last symbol of PDSCH and is calculated as $T_{proc,1}(N_1+d_{1,1})(2048+144)\cdot\kappa 2^{-\mu}\cdot T_C$, where:

$N_1$ is based on the tables of FIGS. 4A and 4B and $\mu$ corresponds to the one of ($\mu_{PDCCH}$, $\mu_{PDSCH}$, $\mu_{UL}$) resulting in the largest $T_{proc,1}$ $d_{1,1}$ depends on the mapping type and time domain allocations of the PDSCH, as well as its overlapping pattern with the PDCCH, as described in sub-clause 5.3 of TS 38.214.

$$\kappa = 64, T_c = \frac{1}{480 \times 10^3 \times 4096},$$

and $d_{1,1}$ is given by the following:

For a PDSCH that is mapping type A as given in clause 7.4.1.1 of TS38.211: if the last symbol of the PDSCH is on the i-th symbol of the slot where i<7, then $d_{1,1}=7-i$, otherwise $d_{1,1}=0$ For UE processing capability 1: If the PDSCH is mapping type B as given in clause 7.4.1.1 of [4, TS 38.211], and if the number of PDSCH symbols allocated is L≥7, then $d_{1,1}=0$, if the number of PDSCH symbols allocated is L≥4 and L≥6, then $d_{1,1}=7-L$.

if the number of PDSCH symbols allocated is L=3 then $d_{1,1}=3+\min(d,1)$, where d is the number of overlapping symbols of the scheduling PDCCH and the scheduled PDSCH.

if the number of PDSCH symbols allocated is 2, then $d_{1,1}=3+d$, where d is the number of overlapping symbols of the scheduling PDCCH and the scheduled PDSCH.

For UE processing capability 2: If the PDSCH is mapping type B as given in clause 7.4.1.1 of [4, TS 38.211], if the number of PDSCH symbols allocated is L≥7, then $d_{1,1}=0$, if the number of PDSCH symbols allocated is L≥3 and L≥6, then $d_{1,1}$ is the number of overlapping symbols of the scheduling PDCCH and the scheduled PDSCH, if the number of PDSCH symbols allocated is 2, then (i) if the scheduling PDCCH was in a 3-symbol CORESET and the CORESET and the PDSCH had the same starting symbol, then $d_{1,1}=3$, (ii) otherwise $d_{1,1}$ is the number of overlapping symbols of the scheduling PDCCH and the scheduled PDSCH.

PUSCH preparation time is defined as the amount of time the end of the reception of the last symbol of the PDCCH carrying the Downlink Control Information (DCI) scheduling the PUSCH and is calculated as $$T_{proc,2}=\max((N_2+d_{2,1})(2048+144)\cdot\kappa 2^{-\mu}\cdot T_C, d_{2,2}),$$
where:

$N_2$ is based on the tables of FIGS. 4C and 4D and $\mu$ corresponds to the one of ($\mu_{DL}$, $\mu_{UL}$) resulting in the largest $T_{proc,2}$, $d_{2,1}$ is defined according to the DMRS configuration as described in sub-clause 6.4 of TS 38.214, and $$\kappa = 64, T_c = \frac{1}{480 \times 10^3 \times 4096}.$$

The processing time $T_{proc,1}$ and $T_{proc,2}$ described above are based on the per-slot maximum BD/CCEs number defined in Table 10.1-2 and 10.1-3 in TS38.213. When a UE is configured with aggregate PDCCH monitoring over multiple slots into a single slot, the UE may need to allocate additional processing resources for PDCCH monitoring during these particular slots, or it may need to use more time for PDCCH decoding. This factor may be taken into account when calculating $T_{proc,1}$ and $T_{proc,2}$.

Embodiment 8: In this embodiment, the PDSCH processing time ($T_{proc,1}$) and PUSCH preparation time ($T_{proc,2}$) may take into account the additional complexity for the UE when aggregated PDCCH monitoring capability is configured in the slot in which the scheduling DCI is located. For example, relaxation of PDSCH processing time and PUSCH preparation time can be considered as additional delay when aggregated PDCCH monitoring is configured.

It is reasonable to assume that the greater the extent to which the PDCCH monitoring is "aggregated" in a slot, the greater the impact (in terms of added delay) on the PDSCH processing and PUSCH preparation timeline. One way to define this quantitatively is based on the value $$Q = \left\lceil \frac{X}{Y} \right\rceil,$$

where X is the actual number of non-overlapped CCEs configured in the slot where the scheduling DCI is located and Y is the maximum non-overlapping CCEs capability defined per slot. As such, Q may be considered to represent the "aggregate multiple" of the non-overlapping CCEs in a single slot.

Embodiment 9: In this embodiment, the additional processing time caused by aggregating of multi-slot non-overlapping CCEs into a single slot depends on the additional complexity to the UE compared to the normal per slot PDCCH monitoring.

Embodiment 10: In this embodiment, the additional process time caused by aggregating of multi-slot non-overlapping CCEs into a single slot can depend on the value $$Q = \left\lceil \frac{X}{Y} \right\rceil,$$

where X is the actual number of non-overlapped CCEs configured in the slot where the scheduling DCI is located and Y is the maximum non-overlapped CCEs defined per slots.

In some embodiments, the additional processing time is proportional to the amount of additional non-overlapping CCEs aggregated in a slot, compared to the maximum non-overlapping CCEs per slot, i.e., it is linear in the normalized quantity $\lfloor (Q-1) \rfloor$ as shown in the following embodiments.

Embodiment 11: In this embodiment, if the slot in which the DCI schedules the PUSCH is configured as aggregation multiple Q, an additional time $\lfloor (Q-1) \rfloor \cdot D_2$ is added to the PUSCH preparation time $T_{process,2}$ defined in [Claus 6.4, TS38.214]. $D_2$ is a constant (per SCS) or a capability signaled by the UE.

Embodiment 12: In this embodiment, if the slot in which the DCI schedules the PDSCH is configured as aggregation multiple Q, an additional time $\lfloor (Q-1) \rfloor \cdot D_1$ is added to the computation of PDSCH processing time $T_{process,1}$ defined in [Claus 5.3, TS38.214]. $D_2$ is a constant (per SCS) or a capability signaled by the UE.

In general, the PDSCH processing time may be less affected by the PDCCH monitoring except when the PDSCH is scheduled in the same slot as the PDCCH, since this timeline is defined relative to the ending symbol of PDSCH and mostly determined by the decoding time of the data channel.

Embodiment 13: In this embodiment, for calculating PDSCH processing time, it may be assumed that only same slot scheduling for PDSCH is affected by the impacts of multi-slot aggregation of PDCCH monitoring.

If the PDCCH monitoring capability is defined per multi-slot span $(X,Y)_{slot,\mu}$ as for example in Embodiment 3, the concept of "aggregation" of capabilities per slot is still present in a more implicit way, and PDCCH monitoring may still affect the delay. This additional delay may be quantized according to the multi-slot span based capability. This can be realized in different ways, e.g. as in the following embodiments.

Embodiment 14: In this embodiment, PDSCH processing time $(T_{proc,1})$ and PUSCH preparation time $(T_{proc,2})$ may take into account the additional complexity for PDCCH monitoring when the PDCCH monitoring capability is configured based on multiple slot span. For example, relaxation of PDSCH processing time and PUSCH preparation time can be considered as additional delay when PDCCH monitoring capability over multiple slots span is configured.

Embodiment 15: In this embodiment, the additional delay in the PDSCH processing time $(T_{proc,1})$ when PDCCH monitoring capability is configured based on multiple slot spans can be determined for each $(X,Y)_{slot}$ span per SCS, i.e., for each $(X_i/Y_i)_{slot,\mu}$, a corresponding $d_{i,\mu,PDSCH}$ may be defined. If the network configures monitoring occasions which satisfy multiple predefined spans $(X_i,Y_i)_{slot,\mu}$, the decoding delay may be the minimum value among the $d_{i,\mu,PDSCH}$.

Embodiment 16: In this embodiment, the additional delay in the PUSCH processing time $(T_{proc,2})$ when PDCCH monitoring capability is configured based on multiple slot spans can be determined for each $(X,Y)_{slot}$ span per SCS, i.e., for each $(X_i, Y_i)_{slot,\mu}$, a corresponding $d_{i,\mu,PUSCH}$ may be defined. If the network configures monitoring occasions which satisfy multiple predefined spans $(X_i,Y_i)_{slot,\mu}$ the decoding delay may be the minimum value among the $d_{i,\mu,PUSCH}$.

In some embodiments, UE PDSCH scheduling delay may be adjusted under a flexible PDCCH monitoring capability. For example, a potential impact for PDCCH decoding delay (due to the flexible PDCCH monitoring capability) is the front end buffer in the UE receiver.

In the Rel-15 and Rel-16 specifications, the first symbol of a PDSCH may be as early as the first symbol of the PDCCH scheduling the PDSCH. In practice, the UE needs to cache the data after the FFT from the first symbol of PDCCH monitoring occasions, even when these data contain no PDSCH data. These data can be refreshed after the UE confirms there is no PDSCH being scheduled in the saved data after decoding (or having failed to decode) the PDCCH. With the extra PDCCH decoding delay due to the aggregated PDCCH capability in a slot, a larger buffer may be required; such a requirement may be undesirable.

One alternative is to introduce a minimum scheduling delay of d symbols for scheduling a PDSCH when the network is configured with aggregated PDCCH capability in a slot. This delay can compensate for the additional time used to decode the PDCCH, and thereby reduce the buffer size requirement.

A similar PDSCH scheduling delay concept already exists in the NR Rel-16 spec for cross carrier scheduling (CCS). A delay (or gap) may be present in the PDSCH scheduling in order to compensate for the UE PDSCH reception preparation time when a scheduling PDCCH and the scheduled PDSCH have different SCSs. The detailed behavior is described in the following two paragraphs (from sub-clause 5.5 of TS 38.214), which refers to the table (Table 5.5-1) of FIG. 4E:

If the $\mu_{PDCCH} < \mu_{PDSCH}$, the UE is expected to receive the scheduled PDSCH, if the first symbol in the PDSCH allocation, including the DMRS, as defined by the slot offset $K_0$ and the start and length indicator SLIV of the scheduling DCI starts no earlier than the first symbol of the slot of the PDSCH reception starting at least $N_{pdsch}$ PDCCH symbols after the end of the PDCCH scheduling the PDSCH, not taking into account the effect of receive timing difference between the scheduling cell and the scheduled cell.

If the $\mu_{PDCCH} > \mu_{PDSCH}$, the UE is expected to receive the scheduled PDSCH, if the first symbol in the PDSCH allocation, including the DMRS, as defined by the slot offset $K_0$ and the start and length indicator SLIV of the scheduling DCI starts no earlier than $N_{pdsch}$ PDCCH symbols after the end of the PDCCH scheduling the PDSCH, not taking into account the effect of receive timing difference between the scheduling cell and the scheduled cell.

Embodiment 17: In this embodiment, when a slot is configured by aggregating the maximum BD/CCEs over multiple slots, the UE is expected to receive the scheduled PDSCH, if the scheduled PDSCH starts no earlier than at least d symbols after the starting symbol of the PDCCH scheduling the PDSCH. Alternatively, the PDSCH scheduling delay may be defined relative to the end of the PDCCH scheduling the PDSCH to further reduce the UE burden.

Embodiment 18: In this embodiment, when a slot is configured by aggregating the maximum BD/CCEs over multiple slots, the UE is expected to receive the scheduled PDSCH, if the scheduled PDSCH starts no earlier than at least d symbols after the end of the PDCCH scheduling the PDSCH.

The selection of d in Embodiment 13 or Embodiment 14 can be a pre-determined value per SCS, or value per SCS based on UE capability signaling. This value may also be scaled by the capacity aggregated number Q defined in Embodiment 6. When PDCCH monitoring capabilities are defined per multiple slot span as in Embodiment 3, d can be a function of multi-slot span $(X,Y)_{slot,\mu}$.

Embodiment 19a: The selection of d in Embodiment 18 can have the following options:

Alternative 1: d can be a fixed value per SCS, and this value can be either pre-determined or set according to UE capability signaling. The value of d can be 0 if UE does not has the buffer constraint.

Alternative 2: d can be a function of Q per SCS, the capacity aggregated number Q defined in Embodiment 6. Such function can be in form of a lookup table (LUT) with respect to Q, or a scale function such as $d = \lfloor (Q-1) \rfloor \cdot d_0$, where $d_0$ can be a pre-determined value per SCS or by UE capability signaling.

Alternative 3: d can be a function of multi-slot span $(X,Y)_{slot,\mu}$ per SCS. Such a function can be in form of a LUT with respect to different $(X,Y)_{slot,\mu}$ for each SCS. When the network configures monitoring occasions which satisfy multiple predefined spans $(X_i,Y_i)_{slot,\mu}$, each of them may correspond to a schedule delay $d_{i,\mu}$, and the scheduling delay may be the minimum value among the $d_{i,\mu}$.

Further, when aggregation of BD/CCE limit over multiple slots and CCS occurs at the same time, the delay value d may be further adjusted. In some embodiments, the logic in 5.5 of TS 38.214 is applied to the newly defined valued for aggregation of BD/CCE limit over multiple slots. In other words, the actual delay value in the scheduled cell is the duration corresponding to d symbols of the scheduling cell. More specifically:

If the $\mu_{PDCCH} \leq \mu_{PDSCH}$, the UE is expected to receive the scheduled PDSCH, if the first symbol in the PDSCH allocation, including the DMRS, as defined by the slot offset $K_0$ and the start and length indicator SLIV of the scheduling DCI starts no earlier than the first symbol of the slot of the PDSCH reception starting at least d PDCCH symbols after the end of the PDCCH scheduling the PDSCH, not taking into account the effect of receive timing difference between the scheduling cell and the scheduled cell.

If the $\mu_{PDCCH} > \mu_{PDSCH}$, the UE is expected to receive the scheduled PDSCH, if the first symbol in the PDSCH allocation, including the DMRS, as defined by the slot offset $K_0$ and the start and length indicator SLIV of the scheduling DCI starts no earlier than d PDCCH symbols after the end of the PDCCH scheduling the PDSCH, not taking into account the effect of receive timing difference between the scheduling cell and the scheduled cell.

Embodiment 19b: In this embodiment, the maximum value of (i) the duration corresponding to d symbols of the scheduling cell and (ii) the duration corresponding to $N_{pdsch}$ symbols of the scheduling cell described in TS 38.214 is used as the minimum scheduling delay in the scheduled cell. In some embodiments, the duration corresponding to the sum or product of (i) the duration corresponding to d symbols of the scheduling cell and (ii) the duration corresponding to $N_{pdsch}$ symbols of the scheduling cell described in 38.214 is used as the minimum scheduling delay in the scheduled cell.

Allowing more flexible scheduling of BD/CCEs may result, as discussed and illustrated above, in a larger number of PDCCHs in some slots. To achieve maximum throughput under this situation, the gNB may schedule Physical Downlink Shared Channels (PDSCHs) covering every slot. This may be made possible in various ways, e.g., (a) a single DCI may schedule multiple PDSCHs, (b) a single DCI may schedule a single multiple-slot PDSCH, or (c) multiple DCIs may schedule multiple PDSCHs and cross slot scheduling may be supported.

Among these possibilities, method (c) is supported under the current Rel-16 NR specification with optional UE capabilities (some parameters may need to be modified). Method (b) may involve a change in the maximum transport block (TB) size and may need to change the procedure of channel coding, which may have greater specification impacts. Method (a) may be implemented using a combination of a redesigned DCI format 1_1 and optionally a new time domain resource allocation (TDRA) table. For example method (a) may be implemented as discussed in the following.

In Rel-15 Dynamic Grant PDSCH time domain allocations may be employed. In NR, the PDSCH time domain resources may be allocated indirectly through the time domain resource allocation (TDRA) entries. The scheduling Downlink Control Indicator (DCI) format 1_0 or 1_1 allocates time resources for a single PDSCH by indicating the index corresponding to an entry of the active TDRA table, each row of which includes a slot offset ($K_0$) and the start and length indicator (SLIV).

NR-U supports Dynamic Grant PUSCH time domain allocations. In Rel-16 NR-U, to improve channel occupancy and reduce signaling overhead in the unlicensed spectrum, a single DCI scheduling multiple contiguous PUSCHs is supported. It utilizes methods of combining enhanced non-fallback DCI format (DCI format 0_1) and enhanced TDRA table to achieve the goal. The TDRA table structure may be modified as follows. Each row of the TDRA table includes 2 to 8 contiguous PUSCH resources, which consist of (i) a single $K_0$ which indicates the slot for the first PUSCH to transmit, and (ii) specifications of the separate SLIV values and mapping types for each of the multiple PUSCHs. Different rows may specify different numbers of resources.

The DCI format 0_1 fields may be modified as follows. The NDI (New data indicator) may be modified so that the size of the field is 2-8 bits determined based on the maximum number of schedulable PUSCHs among all entries of the TDRA table. Each bit corresponds to one scheduled PUSCH. The RV (Redundancy version) field may be modified so that the size is of the field is 2-8 bits determined based on the maximum number of schedulable PUSCHs among all entries of TDRA table. Each bit corresponds to one scheduled PUSCH and the mapping of RV to $rv_{id}$ follows the table of FIG. 5A. The HARQ process ID signaled in the DCI applies to the first scheduled PUSCH. The HARQ process ID is then incremented by 1 for subsequent PUSCHs in the scheduled order. A single MCS is indicated which is applied to all the PUSCHs and the TB sizes are determined based on the Rel-15 procedure.

Figure 5B:
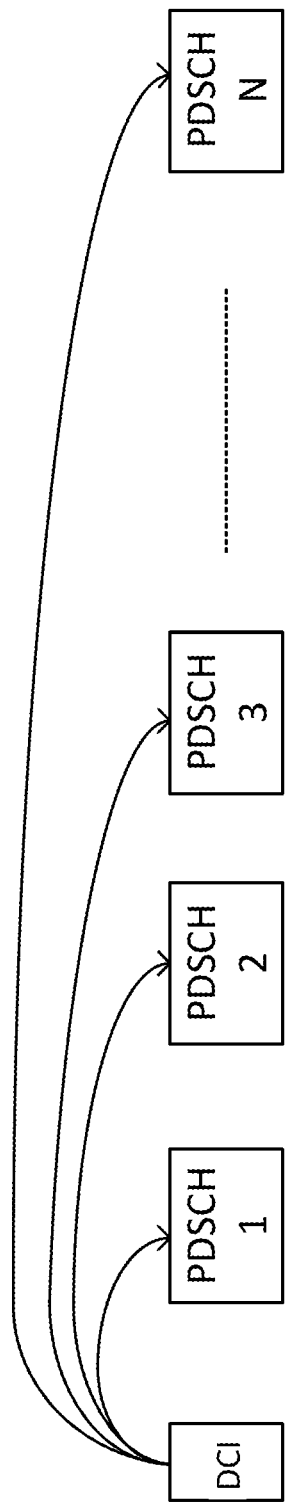
FIG. 5B is an illustration of a DCI scheduling a plurality of PDSCHs, according to some embodiments of the present disclosure.

In some embodiments, multiple PDSCHs may be scheduled by a single DCI, as illustrated in FIG. 5B. Multiple PDSCHs scheduled by single DCI can be implemented using a combination of a modified DCI format and, optionally, a modified TDRA table. The DCI format 1_1 may be used, in part because the fallback DCI 1_0 format has a smaller size and may be less flexible for further extension.

Embodiment 20: In this embodiment, a UE may be scheduled with N contiguous PDSCHs by a DCI as follows. N contiguous PDSCH resources are configured in each row of the TDRA table (e.g., a row of the TDRA table may specify the scheduling of a first PDCCH; and the same row of the TDRA table may also specify the scheduling of a second PDCCH), where $K_0$ indicates the slot in which the UE is scheduled to receive the first PDSCH of the multiple PDSCHs. Separate SLIV values and mapping types (as described in clause 5.1.4 of TS 38.214) for each of the multiple PDSCHs are specified. The gNB configures the number N implicitly by the number of (SLIV, mapping type) entries in each row of the TDRA table.

The single HARQ process ID indicated by DCI 1_1 applies to the first PDSCH; HARQ process ID is then incremented by 1 for each subsequent PDSCH in the scheduled order, with modulo 16 operation applied. An NDI is present and each of the PDSCH allocations is separately indicated (1 bit each, N bits per codeword) in the associated DCI 1_1. The RV of each of the PDSCH allocations is separately indicated (1 bit each, N bits per codeword) in the associated DCI 1_1. The definition for the 1-bit indicator to $K_0$ is according to the table of FIG. 5A. The DCI may further include code block group (CBG) transmission information (CBGTI) and CBG flushing out information (CBGFI) or G*N bits for CBGTI and N bits for CBGFI, where G is 2, 4, 6, or 8 bits determined by higher layer parameters maxCodeBlockGroupsPerTransportBlock and maxNrofCodeWordsScheduledByDCI for the PDSCH.

One issue for the method of Embodiment 20 may be that the CBG support for multiple PDSCHs scheduling may be expensive in terms of DCI payloads if CBGs for all of the N PDSCHs are to be included. An alternative approach is not to support CBG operation in the multiple PDSCH scheduling scheme (e.g., the DCIs may not contain a CBG field).

Embodiment 21: In this embodiment, if CBG based operation is not supported in the multiple PDSCH scheduling scheme of Embodiment 20, then improved granularity in the time domain allocation may be employed. The method described in Embodiment 20 may have the disadvantage that, once a TDRA table is configured, N is determined and the gNB will then schedule N contiguous PDSCHs to UE. When the gNB has less data for a single UE, this scheduling of N contiguous PDSCHs, some of which may not be needed, may waste resources. RRC reconfiguration is a relatively slow procedure, and, as such, such a situation may reduce the flexibility of the gNB for scheduling. In some embodiments, therefore, the size of the frequency domain allocation may be reduced. Under certain conditions, however, this approach may be challenging because of constraints on frequency domain allocations, and, in some embodiments, methods to improve the granularity of the time domain allocation may be used.

For example, an additional N-bit flag may be included in the DCI for each of the N scheduled PDSCHs, which dynamically indicates whether the corresponding PDSCH is transmitted or not. In particular:

Embodiment 22: In this embodiment, an additional dynamic indicator for time domain PDSCH allocations is introduced in the DCI for multi-PDSCH scheduling, with the following possible options:

Alternative 1: An additional N-bit flag is introduced in the DCI scheduling multiple PDSCHs to dynamically schedule fewer than N PDSCHs with same TDRA table. Each bit of this flag indicates whether the corresponding PDSCH is transmitted or not.

Alternative 2: An additional $\lceil \log N \rceil$-bit indicator $N_r$ is included in the DCI. Only the first $N_r$ PDSCH allocations are transmitted.

Embodiment 22 gives the network the flexibility to schedule fewer than N PDSCHs per DCI; however, it adds overhead to the DCI, which may not be desirable. In some embodiments, therefore, this N-bit information is included in the structure of the TDRA table. The following embodiment provides two alternatives to achieve this goal.

Embodiment 23: In this embodiment, an alternative structure is used for TDRA tables for flexible multiple PDSCH scheduling.

Figure 6A:
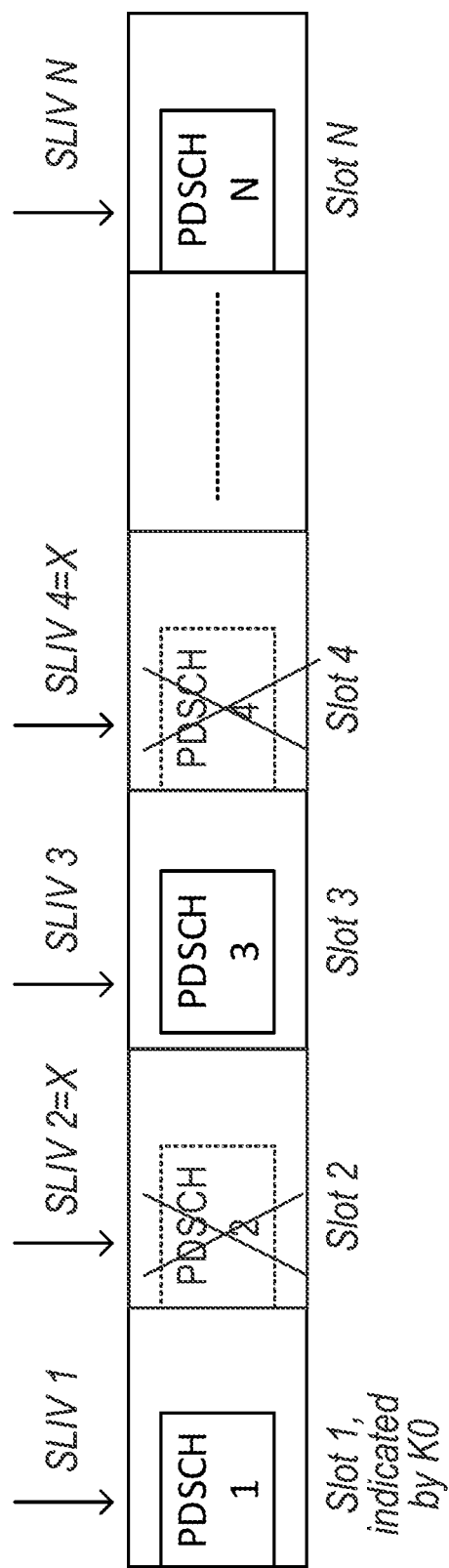
FIG. 6A is a sequence diagram of PDSCH scheduling, according to some embodiments of the present disclosure.

Alternative 1: A special SLIV value X may be introduced. Each row of the TDRA table consists of N fixed entries of SLIVs. If the row has some entries with value X, for the entries of SLIV with value X, the corresponding PDSCH is not scheduled. An example of operation according to this alternative is illustrated in FIG. 6A.

Figure 6B:
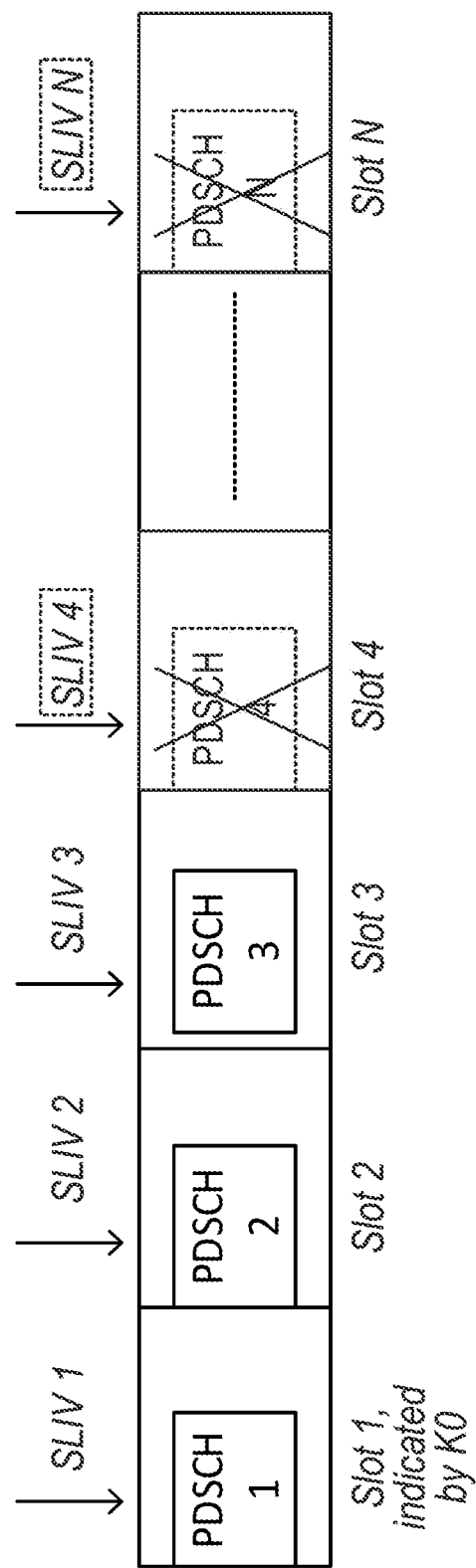
FIG. 6B is a sequence diagram of PDSCH scheduling, according to some embodiments of the present disclosure.

Alternative 2: A flexible number of SLIVs may be supported for each row of the TDRA table. The SLIV indicates time domain allocations in separated slots. An example of operation according to this alternative is illustrated in FIG. 6B.

Figure 6C:
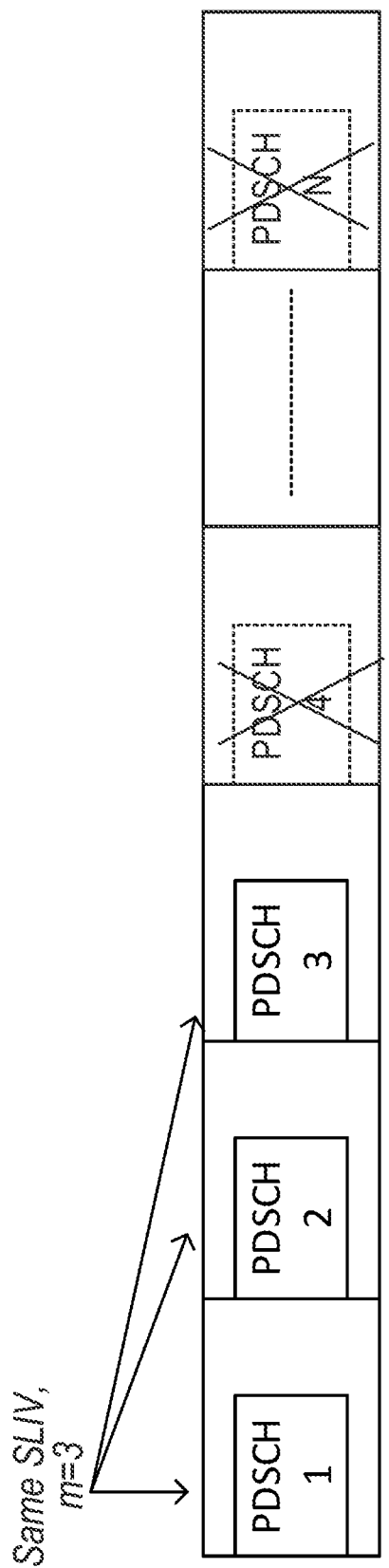
FIG. 6C is a sequence diagram of PDSCH scheduling, according to some embodiments of the present disclosure.

Alternative 3: Each row of the TDRA table includes a new field with a multiplicity number m and a single SLIV value. When scheduling by DCI, m PDSCHs with the same SLIV are scheduled in m consecutive slots. An example of operation according to this alternative is illustrated in FIG. 6C.

In the schemes of Alternative 3, the time domain allocation patterns across multiple slots are the same. This places some restrictions on scheduling; however, it may have a potential benefit in the bands above 52.6 GHz.

As mentioned above, there may be coverage issue with higher SCS numerology. One way to combat such coverage loss in PDSCH transmission is PDSCH repetition, which is already supported in NR since Rel-15. However, Rel-15 PDSCH repetition is through RRC parameter pdsch-AggregationFactor, the changing of which may be a slow process.

Due to the nature of beam operation in the frequency range above 52.6 GHz, the UE may be required to operate in a more dynamical reception range, and it may be advantageous to introduce ways to switch the PDSCH repetition and PDSCH multiple scheduling dynamically, in a manner that is faster than changing the RRC parameter pdsch-AggregationFactor. For example, a TDRA scheme similar to that of Alternative 3 may be implemented, and may provide a way to switch the PDSCH repetition and scheduling of multiple PDSCHs dynamically.

Embodiment 24: In this embodiment, dynamic switching between multiple PDSCHs and PDSCH repetition scheduling is supported. The method may include:

Alternative 1: Use of the TDRA table, as in Alternative 3 of Embodiment 23:

Each entry of the TDRA table provides a value m and a single SLIV value. The integer m can indicate the number of multiple PDSCHs or the number of repetitions for PDSCH repetition scheduling. Switching between the two modes may be triggered by the DCI or by the MAC-CE.

Alternative 2: Use of an augmented TDRA table from Alternative 3 of Embodiment 23 with an additional indicator. The additional indicator indicates explicitly whether the corresponding entries are for multiple PDSCHs or PDSCH repetition.

In some embodiments, modifications may be made to HARQ-ACK operation. For example, the PDSCH-to-HARQ timing offset may be adjusted.

Embodiment 25: In this embodiment, for a PDCCH scheduling multiple PDSCHs (with $N_{max}$ being the maximum number of scheduled PDSCHs), the values of certain fields in the scheduling PDCCH may be set according to embodiments 6-1 through 6-3 below. In Embodiment 25, there are L DCI fields for the PDSCH-to-HARQ timing offset, $K_1$, $(K_1^{(1)}, \ldots, K_1^{(L)})$ where $L \leq N_{max}$ and L is RRC configured.

Embodiment 25-1: In Embodiment 25, the UE may apply a PDSCH-to-HARQ timing offset, downlink assignment index (DAI) and PRI fields as follows.

If the number of scheduled PDSCHs N is less than or equal to L, $K_1^{(l)}$ applies to the l-th scheduled PDSCH for $l=1, \ldots, L$.

If the number of scheduled PDSCHs N is greater than L, the scheduled PDSCHs are grouped into L groups such that each group includes $$\left\lceil \frac{N}{L} \right\rceil PDSCHs$$

except the last group which includes $$N - (L-1)\left\lceil \frac{N}{L} \right\rceil PDSCHs.$$

$K_1^{(l)}$ is applied to all the PDSCHs in group l for $l=1, \ldots, L$.

Embodiment 25-2 (Single field for PDSCH-to-HARQ timing offset): In Embodiment 25, L=1. That is a single entry for $K_1$ which is present in the DCI. The slot offset $K_1$ is applied to the slot of the latest PDSCHs among the scheduled ones. The ACK/NACK (A/N) of all of the scheduled PDSCHs are transmitted in the same PUCCH slot.

Embodiment 25-2 can be extended to include a case L>1. In this case, multiple entries of $K_1$ are present in the DCI, the scheduled PDSCHs are grouped, and each $K_1$ is applied from the latest PDSCH in the group to determine one PUCCH slot for all the PDSCHs in the group.

Embodiment 25-3 (Multiple fields for PDSCH-to-HARQ timing offset and latest PDSCH as reference): In Embodiment 25, the UE applies a PDSCH-to-HARQ timing offset, as follows.

If the number of scheduled PDSCHs N is less than or equal to L, $K_1^{(l)}$ applies to the l-th scheduled PDSCH for $l=1, \ldots, L$ If the number of scheduled PDSCHs N is greater than L, the scheduled PDSCHs are grouped into L groups such that each group includes $$\left\lceil \frac{N}{L} \right\rceil PDSCHs$$

except the last group which includes $$N - (L-1)\left\lceil \frac{N}{L} \right\rceil PDSCHs.$$

$K_1^{(l)}$ is applied to the slot in which the latest PDSCH in group l is received. The determined PUCCH slot, after applying $K_1^{(l)}$, is the PUCCH slot for all the PDSCHs in the group.

Downlink assignment index and PUCCH resource determination may be affected, in some embodiments.

Once a common understanding between the UE and the gNB is established for determining the PUCCH slots for each of the scheduled PDSCHs according to the proposed methods above or any other method, the UE applies the DAI and PRI fields in the DCI to each of the determined PUCCH slots according to one of the following methods. In the following $P \leq N_{max}$ is the number of determined PUCCH slots.

Embodiment 26: In this embodiment, for a PDCCH scheduling multiple PDSCHs, the number of the following fields in the scheduling PDCCH is determined as below, with $N_{max}$ being the maximum number of scheduled PDSCHs.

There are M DCI fields for downlink assignment index (DAI) and PUCCH resource indicator (PRI) as $(DAI_1^{(1)}, \ldots, DAI_1^{(M)})$ and $(PRI_1^{(1)}, \ldots, PRI_1^{(M)})$ where $M \leq N_{max}$ and M is RRC configured.

Embodiment 27 (DAI and PUCCH Resource Determination): In this embodiment, the number of determined PUCCH slots P is always smaller or equal to the number of DAI and PRI fields M in the DCI. The UE applies $DAI^{(l)}$ with respect to and $PRI^{(l)}$ to the l-th PUCCH slot for $l=1, \ldots, P$ where the PUCCH slots are ordered in ascending order of the start time of the slot, i.e., the l-th PUCCH slots starts earlier than the (l+1)-th PUCCH slot The HARQ-ACK Codebook (CB), e.g, the Type-2 HARQ-ACK Codebook may be affected, in some embodiments.

In the following methods, it is assumed that with reference to one PUCCH slot, a scheduling PDCCH includes a single entry for the DAI field and a DCI scheduling a multi-PDSCH cell, and can schedule up to $N_{max}$ PDSCHs.

Embodiment 28 (DAI incremented by the number of scheduled PDSCHs, A/N bits reserved according to DAI values): In this embodiment, in type-2 HARQ-ACK CB, if a scheduling PDCCH schedules $N \leq N_{max}$ PDSCHs, the value of C-DAI in the DCI is incremented by N from the value of C-DAI on the previous DCI. The UE reserves N A/N bits in case it detects such a DCI. As used herein, the "previous DCI" refers to an ordering of the DCIs in which the DCIs are ordered first in ascending order across serving cell indexes for the same monitoring occasion (MO) and then in ascending order across MO start times.

Embodiment 29 (DAI incremented by 1, A/N bits reserved according to $N_{max}$): In this embodiment, in type-2 HARQ-ACK CB, if a scheduling PDCCH schedules $N \leq N_{max}$ PDSCHs, the value of C-DAI in the DCI is incremented by 1 from the value of C-DAI on the previous DCI. The UE reserves $N_{max}$ A/N bits regardless of whether it detects the DCI or not. In the case of multiple CBGs per PDSCH, the UE may reserve (and transmit, in the PUCCH) a number of bits equal to the maximum, over each of the active serving cells configured to the UE, of the product of (i) the maximum number of CBGs per PDSCH over the serving cell, and (ii) the maximum number of SLIVs in any row of the TDRA table for the serving cell.

Embodiment 30 (DAI incremented by the number of scheduled PDSCHs, A/N bits reserved according to $N_{max}$): In this embodiment, in type-2 HARQ-ACK CB, if a scheduling PDCCH schedules $N \leq N_{max}$ PDSCHs, the value of C-DAI in the DCI is incremented by N from the value of C-DAI on the previous DCI. The UE reserves $N_{max}$ A/N bits regardless of whether it detects the DCI or not.

Figure 7:
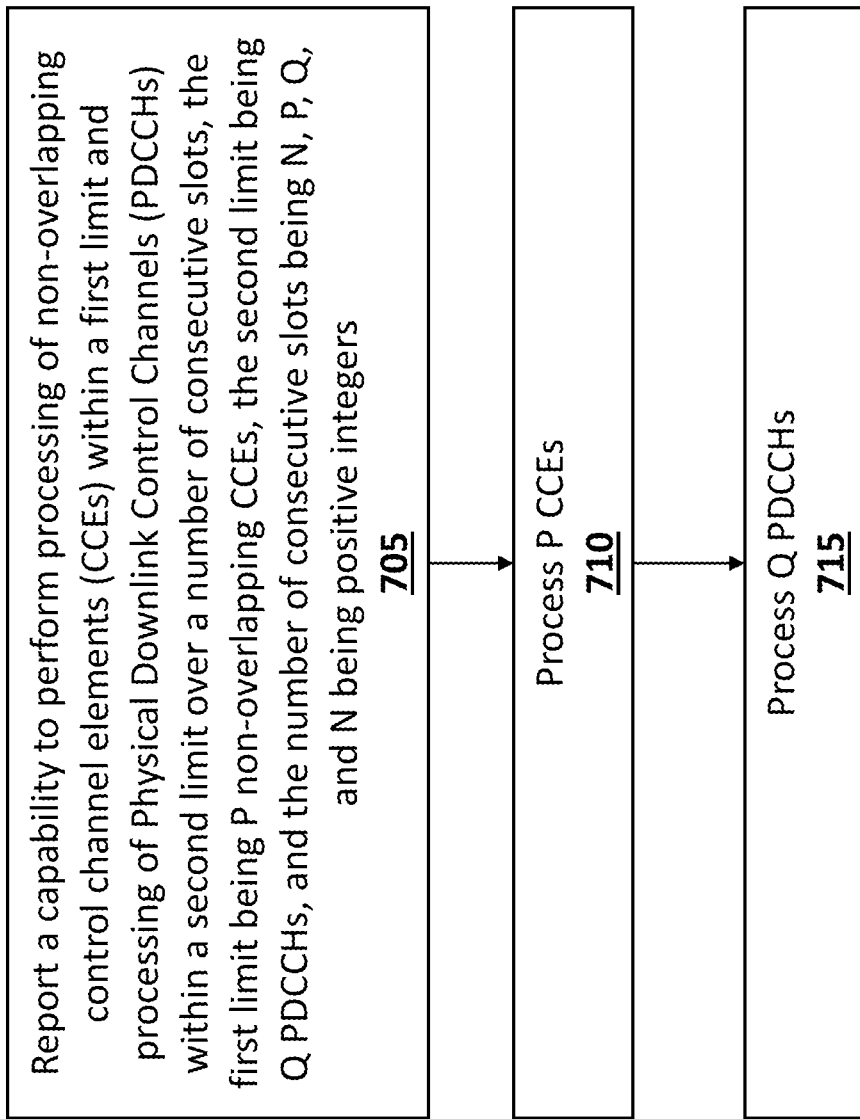
FIG. 7 is a flowchart of a method, according to an embodiment of the present disclosure.

FIG. 7 shows a method, according to some embodiments. The method includes reporting, at 705, by a UE, a capability to perform processing of non-overlapping control channel elements (CCEs) within a first limit and processing of Physical Downlink Control Channels (PDCCHs) within a second limit over a number of consecutive slots, the first limit being P non-overlapping CCEs, the second limit being Q PDCCHs, and the number of consecutive slots being N, P, Q, and N being positive integers. This reporting by the UE may be an indication that the UE is capable of supporting aggregated limits on non-overlapping CCEs and on PDCCHs without necessarily specifying the aggregated limits the UE is capable of supporting (these limits may be standard-specified or they may be reported (e.g., separately reported) by the UE). The method further includes processing, at 710, by the UE, P CCEs received within M slots, M being less than or equal to N; and processing, at 715, by the UE, Q PDCCHs received within the M slots. P may be greater than a corresponding standard-specified per-slot limit (i.e., a limit that applies in a situation in which aggregation of the limit over multiple slots is not used), P may be less than or equal to the product of N and the corresponding standard-specified per-slot limit, Q may be greater than a corresponding standard-specified per-slot limit, and Q may be less than or equal to the product of N and the corresponding standard-specified per-slot limit.

Figure 8:
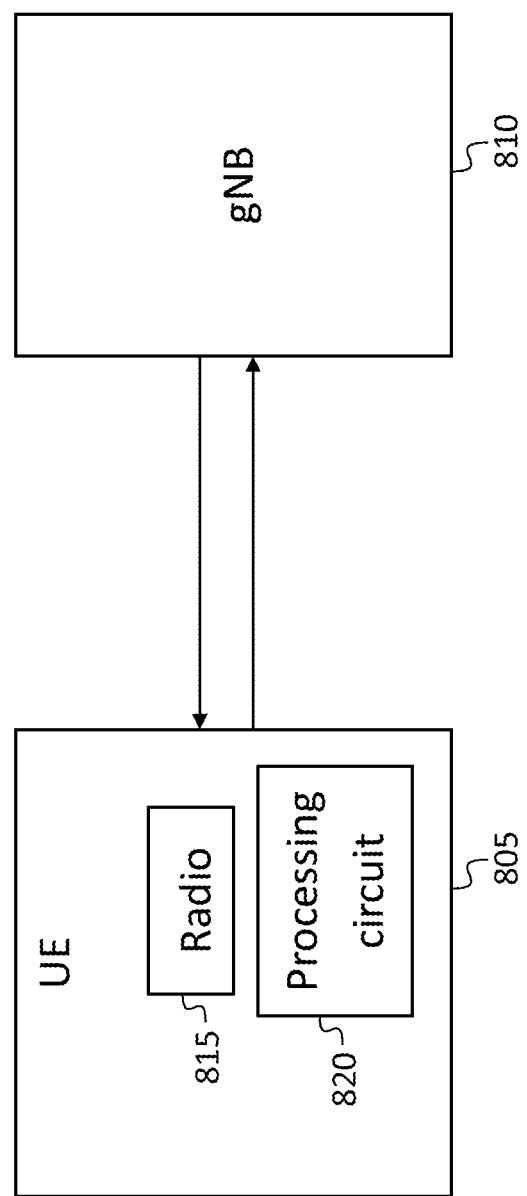
FIG. 8 is a block diagram of a portion of a mobile communications system, according to an embodiment of the present disclosure.

FIG. 8 shows a system including a UE 805 and a gNB 810, in communication with each other. The UE may include a radio 815 and a processing circuit (or a means for processing) 820, which may perform various methods disclosed herein, e.g., the method illustrated in FIG. 4. For example, the processing circuit 820 may receive, via the radio 815, transmissions from the gNB 810, and the processing circuit 820 may transmit, via the radio 815, signals to the gNB 810.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. As mentioned above, a processing circuit, or means for processing, in a UE, may perform methods described herein, e.g., by transmitting messages (through a radio of the UE) or by receiving messages (through the radio of the UE), and, in some instances, by performing further processing.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of systems and methods for accommodating a high subcarrier spacing in mobile communications have been specifically described and illustrated herein, many modifications and variations will be apparent to those skilled in the art. Accordingly, it is to be understood that systems and methods for accommodating a high subcarrier spacing in mobile communications constructed according to principles of this disclosure may be embodied other than as specifically described herein. The invention is also defined in the following claims, and equivalents thereof.

What is claimed is:

1. A method, comprising:
receiving, by a user equipment (UE), a downlink control information (DCI),
wherein the DCI specifies scheduling of a first Physical Downlink Shared Channel (PDSCH) and a second PDSCH,
wherein:
the DCI identifies a first row of a time domain resource allocation TDRA table;
the first row of the TDRA table specifies the scheduling of a first number of PDSCHs; and
a second row of the TDRA table specifies the scheduling of a second number of PDSCHs, different from the first number.

2. The method of claim 1, wherein the DCI does not contain a code block group (CBG) field.

3. The method of claim 1, further comprising:
receiving, by the UE, an indication that a third PDSCH will not be transmitted;
receiving the first PDSCH;
receiving the second PDSCH; and
not receiving the third PDSCH.

4. The method of claim 1, wherein the DCI comprises a timing offset, and
the method further comprises transmitting an ACK or a NACK in a Physical Uplink Control Channel (PUCCH) slot, the PUCCH slot following a latest scheduled PDSCH by the timing offset.

5. The method of claim 1, wherein the DCI comprises a downlink assignment index (DAI), the DAI having a value greater, by more than one, than a DAI in a most recent previously received DCI,
wherein a difference between the DAI and the DAI in the most recent previously received DCI equals a number of start and length indicators (SLIVs) in one of the first row or the second row of the TDRA table identified by the DCI.

6. The method of claim 1, further comprising transmitting, by the UE, in a PUCCH, a maximum number of bits over each active serving cell configured to the UE, of a product of:
a maximum number of code block groups (CBGs) per PDSCH over the active serving cell, and
a maximum number of start and length indicators (SLIVs) in any row of the TDRA table for the active serving cell,
wherein the DCI comprises a downlink assignment index (DAI), the DAI having a value greater, by one, than a DAI in a previous DCI.

7. The method of claim 1, wherein the DCI comprises a first downlink assignment index (DAI) corresponding to the first PDSCH and a second DAI corresponding to the second PDSCH.

8. The method of claim 1, further comprising:
reporting, by the UE, a capability to perform processing of non-overlapping control channel elements (CCEs) within a first limit and processing of Physical Downlink Control Channels (PDCCHs) within a second limit over a number of consecutive slots, the first limit being P non-overlapping CCEs, the second limit being Q PDCCHs, and the number of consecutive slots being N, P, Q, and N being positive integers;
processing, by the UE, P CCEs received within M slots, M being less than or equal to N; and
processing, by the UE, Q PDCCHs received within the M slots,
P being greater than a corresponding standard-specified per-slot limit,
P being less than or equal to a product of N and the corresponding standard-specified per-slot limit,
Q being greater than a corresponding standard-specified per-slot limit, and
Q being less than or equal to the product of N and the corresponding standard-specified per-slot limit.

9. The method of claim 8, further comprising:
reporting, by the UE, as a capability, a value of P and reporting, by the UE, as a capability, a value of Q.

10. The method of claim 8, further comprising reporting, by the UE, as a capability, a value of N.

11. The method of claim 8, further comprising receiving the P CCEs in resource elements having a subcarrier spacing of 480 kHz or more.

12. The method of claim 8, wherein the processing, by the UE, of the P CCEs comprises processing no CCEs received within $N-N_0$ slots, $N_0$ being a positive integer.

13. The method of claim 8, further comprising sending, by the UE, an ACK, the ACK following a last symbol of a corresponding Physical Downlink Shared Channel (PDSCH) by a processing time greater than a corresponding standard-specified processing time for non-aggregated BD/CCE limits.

14. The method of claim 8, further comprising sending, by the UE, a PUSCH, the PUSCH following a last symbol of a corresponding PDCCH by a preparation time greater than a corresponding standard-specified preparation time for non-aggregated BD/CCE limits.

15. The method of claim 8, wherein a particular PDCCH of the Q PDCCHs schedules a Physical Downlink Shared Channel (PDSCH), the method further comprising receiving, by the UE, the PDSCH, the PDSCH beginning d symbols after the particular PDCCH, d being a positive integer, d being a standard-specified value or a value reported as a capability by the UE.

16. A system comprising:
a user equipment (UE), the UE comprising:
a radio; and
a processing circuit,
the processing circuit being configured to receive a downlink control information (DCI),
wherein the DCI specifies scheduling of a first Physical Downlink Shared Channel (PDSCH) and a second PDSCH,
wherein the DCI comprises a timing offset,
wherein the processing circuit is configured to transmit an ACK or a NACK in a Physical Uplink Control Channel (PUCCH) slot, the PUCCH slot following a latest scheduled PDSCH by the timing offset.

17. The system of claim 16, wherein:
the DCI identifies a first row of a time domain resource allocation (TDRA) table;
the first row of the TDRA table specifies the scheduling of a first number of PDSCHs; and
a second row of the TDRA table specifies the scheduling of a second number of PDSCHs, different from the first number.

18. The system of claim 17, wherein the DCI does not contain a code block group (CBG) field.

19. A system comprising:
a user equipment (UE), the UE comprising:
a radio; and
means for processing,
the means for processing being configured to receive a downlink control information (DCI),
wherein the DCI specifies a scheduling of a first Physical Downlink Shared Channel (PDSCH) and a second PDSCH,
wherein:
the DCI identifies a first row of a time domain resource allocation TDRA table:
the first row of the TDRA table specifies the scheduling of a first number of PDSCHs; and
a second row of the TDRA table specifies the scheduling of a second number of PDSCHs, different from the first number.

* * * * *